United States Patent [19]

Kanai et al.

[11] Patent Number: 4,835,636
[45] Date of Patent: May 30, 1989

[54] DUSTPROOF DOOR MECHANISM

[75] Inventors: Takao Kanai; Katsumi Yamaguchi; Shigeo Kinoshita; Kikuo Yoshikawa; Syouichiro Yokoi, all of Tokyo, Japan

[73] Assignee: Clarion Co., Ltd., Tokyo, Japan

[21] Appl. No.: 83,568

[22] Filed: Aug. 7, 1987

[30] Foreign Application Priority Data

Aug. 12, 1986 [JP] Japan .................................. 61-187722

[51] Int. Cl.4 .............................................. G11B 15/66
[52] U.S. Cl. ...................................... 360/96.5; 360/93
[58] Field of Search ..................... 360/85, 93, 95, 96.5, 360/96.6; 369/75.1, 75.2, 77.1, 77.2

[56] References Cited

U.S. PATENT DOCUMENTS 4,462,714  2/1987  Miyamoto .......................... 360/96.5

FOREIGN PATENT DOCUMENTS

| 3644284 | 6/1987 | Fed. Rep. of Germany | 360/96.6 |
| 58-94158 | 6/1983 | Japan | 360/96.5 |
| 58-164050 | 9/1983 | Japan | 360/85 |
| 59-221862 | 12/1984 | Japan | 360/96.5 |
| 60-647 | 1/1985 | Japan | 360/96.6 |
| 60-119661 | 6/1985 | Japan | 360/96.5 |
| 61-148665 | 7/1986 | Japan | 360/96.5 |
| 61-190749 | 8/1986 | Japan | 360/96.5 |

Primary Examiner—John H. Wolff
Attorney, Agent, or Firm—Flynn, Thiel, Boutell & Tanis

[57] ABSTRACT

A dustproof door mechanism includes a dustproof door pivotably supported by a shaft and normally biased by a spring to its closed position, a door opening cam integrally formed with a loading gear rotatable in opposite directions to drive a cassette loading mechanism, and a door opening link engaging the dustproof door and pivoted by the door opening cam in a direction for opening the door.

4 Claims, 3 Drawing Sheets

DUSTPROOF DOOR MECHANISM

FIELD OF THE INVENTION

This invention relates to a dustproof door mechanism for an audio tape player, video deck (VTR) or other tape player, and more particularly to an improved opening/closing means in such a dustproof door mechanism.

BACKGROUND OF THE INVENTION

A dustproof door is provided at a cassette insertion aperture of a tape player to protect the interior of the tape player against dust or other foreign substances.

One of several existing prior art dustproof door mechanisms for use in a cassette tape player is shown in FIG. 4, in which the mechanism includes a shaft 21 supported at an upper portion of a cassette insertion aperture, a stopper 22 provided at a lower portion of the aperture and a dustproof door 23 pivotably supported by the shaft 21 and biased by a spring (not shown) from the interior of the aperture toward the stopper 22.

When a cassette C is inserted through the aperture, the dustproof door 23 is engaged by an end of the cassette C and rotated thereby in the cassette insertion direction. After the cassette C is fully inserted and dropped onto a reel base 24, the dustproof door 23 is engaged by the other end of the cassette C and maintained in a semi-opened configuration. When the cassette C is ejected, the dustproof door 23 is rotated upwardly by the cassette C (which is elevated from the reel base 24) into a position to allow the cassette C to move outwardly from the interior of the tape player.

Obviously, the prior art dustproof door mechanism in which the dustproof door 23 is maintained in a semi-opened configuration while the cassette C is held in the tape player cannot fully protect the interior against dust or other foreign substances A countermeasure against this problem will be an arrangement of inserting the cassette C more deeply in the tape player up to a position allowing the dustproof door 23 to rotate back to its closing position. In this case, however, the cassette C itself, when elevated for ejection, cannot rotate the dustproof door 23 to its open position, and rather urges same to the stopper 22. In this configuration, the door will never be opened.

OBJECT OF THE INVENTION

It is therefore an object of the invention to provide a dustproof door mechanism in which the dustproof door fully shuts the cassette insertion aperture after a cassette is loaded in the tape player, and the dustproof door is automatically opened in response to an ejecting operation of a cassette loading mechanism.

SUMMARY OF THE INVENTION

According to the invention, there is provided a dustproof door mechanism comprising:

a dustproof door pivotably mounted at a cassette insertion aperture of a tape player and normally biased by a first spring to a position for closing said cassette insertion aperture;

a loading gear rotatable in opposite directions to drive a cassette loading mechanism in the tape player;

a door opening cam integrally formed on said loading gear;

a door opening link pivotably supported on a fixed portion of the tape player and having an engaging portion engageable with the front face of said door upon cassette loading;

a drive link responsive to said cam to pivot said door opening link in a direction for opening said door; and a second spring biasing said door opening link in a direction for closing said door.

With this arrangement, the dustproof door is moved by an end of a cassette against the energy of a closing spring when the cassette is inserted in the tape player, and the dustproof door is rotated back to its closed position under the energy of the closing spring when the cassette is fully inserted in the tape player and dropped onto a reel base by a loading mechanism Upon cassette ejection, the door opening cam provided on a loading gear of the loading mechanism rotates the door opening link to rotate the dustproof door in engagement with the door opening link to its open position against the energy of the closing spring so that the cassette is discharged by passing through the opened dustproof door.

DETAILED DESCRIPTION

Figure 1A:
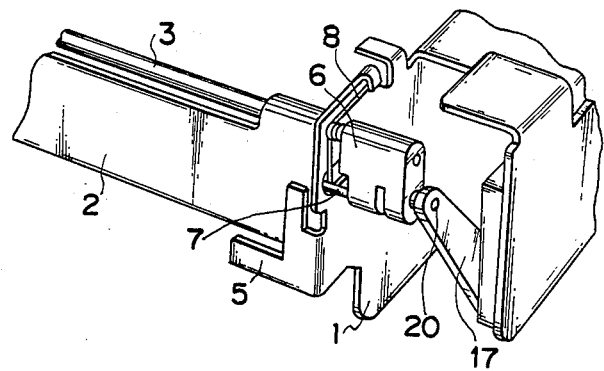
FIGS. 1A and 1B are perspective views showing an embodiment of the inventive dustproof door mechanism, with a door being closed in FIG. 1A and opened in FIG. 1B.
Figure 1B:
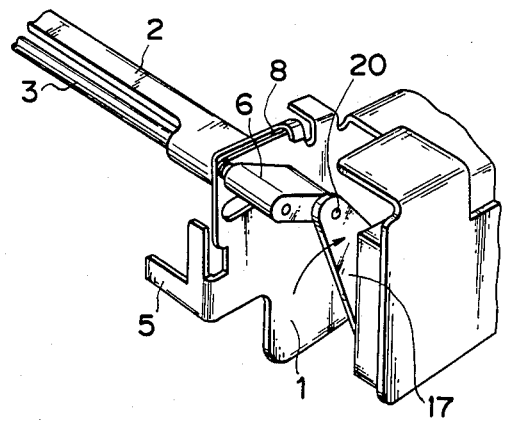
Figure 2A:
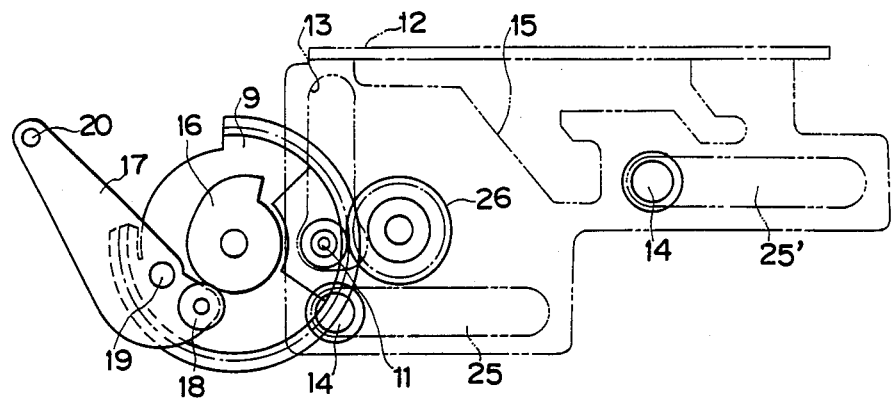
FIGS. 2A and 2B are side elevations of the same mechanism, with the door being closed in FIG. 2A and opened in FIG. 2B.
Figure 2B:
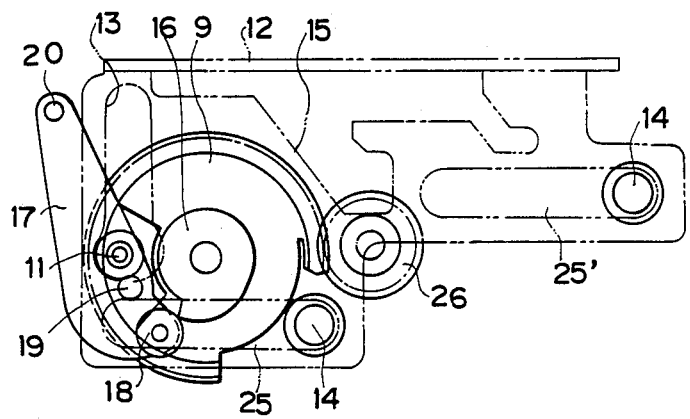
Figure 3:
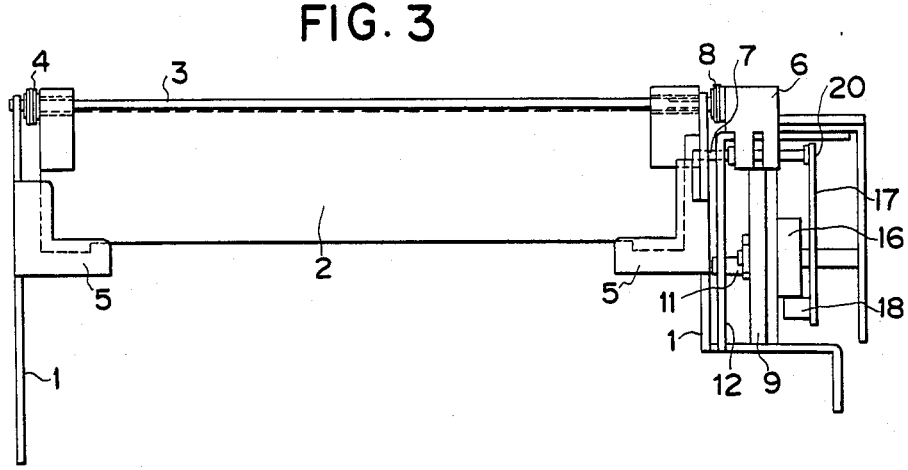
FIG. 3 is a front elevation of the same mechanism.
Figure 4A:
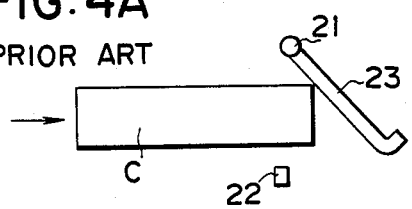
FIGS. 4A through 4C are side elevations showing sequential movements of a prior art dustproof door.
Figure 4B:
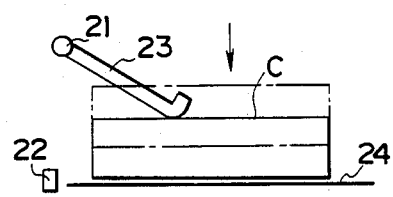
Figure 4C:
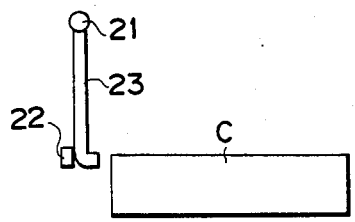

The invention is described below in detail, referring to an embodiment illustrated in the drawings.

A dustproof door 2 is mounted at a cassette insertion aperture provided between right and left vertical walls 1—1 of a tape player. The dustproof door 2 is pivotably supported by a shaft 3 extending through the vertical walls 1—1. A spring 4 is provided between one end of the shaft 3 and one of the vertical walls 1—1 to bias the dustproof door 2 outwardly from the interior of the tape player. Stoppers 5—5 are provided at lower positions of the front ends of the vertical walls 1—1 to contact the lower edge of the dustproof door 2 biased by the spring 4. The other end of the shaft 3 extends outwardly beyond the vertical wall 1, and this outer extension pivotably supports the upper end of a door opening link 6. At the lower end of the door opening link 6 is provided an opening/closing member 7 extending through the vertical wall 1 and engaging the front face of the dustproof door 2. Between the door opening link 6 and the vertical wall 1 is provided a spring 8 which biases the door opening link 6 to a position for closing the door.

A cassette loading mechanism is located outside the door opening link 6. The cassette loading mechanism includes a loading gear 9 driven in the opposite directions by a motor-driven drive gear 26. The loading gear 9 has on one surface thereof opposed to the vertical wall 1 a guide roller 11 which is accepted in a vertical guide groove 13 of a slide plate 12 supported on an outer surface of the vertical wall 1 for movement in back and forth directions. More specifically, the slide plate 12 is supported for relative movement in back and forth directions with respect to the vertical wall 1 by an arrangement in which guide rollers 14-14' provided on the vertical wall 1 engage grooves 25-25' provided in the slide plate 12 in a front-to-rear extending configuration. The slide plate 12 has a cam 15 which drops a cassette holder (not shown) of the tape player onto a reel base when the slide plate 12 advances.

The loading gear 9 of the cassette loading mechanism as described above has on one surface thereof a door opening cam 16 in an integral configuration. The outer circumferential margin of the door opening cam 16 engages a cam follower 18 provided at an end of a drive link 17. The drive link 17 is pivotably supported by a shaft 19 and connected to the lower end of the door opening link 6 by an engaging member 20 provided at the other end of the drive link 17. The door opening link 6 is configured so that as the loading gear 9 rotates and moves the slide plate 12 ahead, the door opening cam 16 rotates the drive link 17 clockwisely to move said other end of the drive link 17 rearwardly of the tape player, and so that when the cassette holder drops onto the reel base after full advance of the slide plate 12, the door opening cam 16 brings said other end of the drive link 17 forwardly of the tape player.

With this arrangement, when a cassette is inserted through the cassette insertion aperture, its inner end engages the dustproof door 2. The dustproof door 2 rotates about the shaft 3 rearwardly against the energy of the spring 4 so that the cassette can move to the interior of the tape player. At this time, the door opening link 6 for opening the dustproof door 2 engages the front surface of the dust proof door 2, and the dustproof door 2 can rotate rearwardly independently of the opening link 6.

The cassette inserted in the tape player is subsequently pulled into the cassette holder (not shown) by the loading mechanism, and then drops onto the reel base together with the cassette holder. Full insertion of the cassette and dropping movement of the cassette holder are established by the loading gear 9 which is driven by a motor of the tape player to move the slide plate 12 forwardly. Due to rotation of the loading gear 9, the door opening cam 16 thereon rotates together and brings the drive link 17 and the door opening link 6 rearwardly of the tape player. Therefore, the dustproof door 2 once rotated rearwardly of the tape player by the cassette insertion force tends to rotate back to its closed position under the energy of the spring 4 after the cassette moves beyond the door. However, the door 2 is engaged by the opening/closing member 7 of the door opening link 6 rotated in its opening direction and does not rotate back to its closed position immediately. When the loading gear 9 rotates to a position to fully drop the cassette onto the reel base, the cam follower 18 comes to the smallest diameter position of the door opening cam 16. Therefore, the drive link 17 and the door opening link 6 become free and rotate back forwardly under the energy of the spring 8. Responsively, the dustproof door 2 heretofore blocked by the door opening link 6 is now allowed to rotate forwardly to its closing position under the energy of the spring 4.

For cassette ejecting operation, the loading gear 9 is rotated in the opposite direction by reverse rotation of the loading motor. Responsively, the slide plate 12 operatively linked to the loading gear 9 begins to move rearwardly of the tape player, and its cam 15 elevates the cassette holder. Concurrently, the door opening cam 16 on the loading gear 9 rotates to pivot the drive link 17 and the door opening link 6 connected thereto rearwardly of the tape player. As a result, the dustproof door 2 is pushed and rotated by the opening/ closing member 7 of the door opening link 6 rearwardly of the tape player against the energy of the spring 4, and the cassette insertion aperture is opened. After this, as the slide plate 12 moves further, the cassette holder is elevated to a horizontal position, and the cassette is subsequently is pushed out of the cassette holder and discharged from the tape player through the cassette insertion aperture which is fully open now. With a further rotation of the loading gear 9 after ejection of the cassette in which the smaller or smallest diameter portion of the door opening cam 16 thereon engages the cam follower 18, the door opening link 6 gradually rotates forwardly until the dustproof door shuts the insertion aperture.

As described above, according to the inventive dustproof door mechanism configured to open and close the dustproof door in response to a cassette loading operation, the dustproof door can fully close the cassette insertion aperture while a cassette is held in the tape player. As a result, the interior of the tape player is fully protected against dust or other foreign substances. Particularly, since the door opening cam is formed integrally with the gear which drives the loading mechanism for full insertion of the cassette in the tape player, the cassette loading/ejecting operation completely meets with door opening/closing motion. Therefore, the invention eliminates such a trouble that the dustproof door hits the cassette due to an erroneous timing for door opening or closing motion.

What is claimed is:

1. A dustproof door mechanism, comprising:

a dustproof door supported on a shaft located near a cassette insertion aperture of a tape player for pivotal movement about an axis between closed and open positions respectively obstructing and permitting insertion of a cassette through said aperture, said door having thereon a surface facing in a first direction and said door moving away from said closed position in a second direction substantially opposite said first direction;

a first spring which yieldably urges said door toward said closed position;

a loading gear selectively rotatably in opposite rotation directions to drive a cassette loading mechanism in the tape player and having a door opening am integrally formed thereon;

a door opening link supported for pivotal movement about said axis between said first and second positions and having an engaging portion engageable with said surface of said door, said door being movable from its closed to its open position independently of said opening link when said opening link is in its first position, and wherein as said opening link moves from its first position to its second position engagement of said engagement portion with said surface on said door effects movement of said door to its open position against the urging of said spring;

a second spring engaging said door opening link to yieldably urge said door opening link toward its first position; and a door drive link supported for pivotal movement between first and second positions, having cam follower means thereon engaging said door opening cam for effecting movement of said door drive link from its first to its second position in response to rotation of said cam, and having a portion pivotally coupled to said door opening link, said drive link moving said opening link from its first position to its second position as said drive link is moved from its first position to its second position by said cam.

2. A mechanism of claim 1, wherein said opening link is pivotally supported on said shaft at a location spaced axially from said door.

3. A mechanism of claim 1, wherein said first spring is a torsion spring which is supported on said shaft and which has two legs respectively engaging said door and a stationary part of the tape player; and wherein said second spring is a torsion spring which is supported on said shaft and which has two legs respectively engaging said opening link and a stationary part of the tape player.

4. A mechanism of claim 1, wherein said door drive link pivots about an axis which is located between said cam follower means and said engaging portion thereof and which is substantially parallel to said shaft.

* * * * *

UNITED STATES PATENT AND TRADEMARK OFFICE
CERTIFICATE OF CORRECTION

PATENT NO. : 4 835 636

DATED : May 30, 1989

INVENTOR(S) : Takao KANAI et al

It is certified that error appears in the above-identified patent and that said Letters Patent is hereby corrected as shown below:

Column 4, line 48; change "am" to ---cam---.

Signed and Sealed this

Twenty-second Day of May, 1990

Attest:

HARRY F. MANBECK, JR.

*Attesting Officer*  *Commissioner of Patents and Trademarks*